United States Patent
Newton

[15] 3,698,480
[45] Oct. 17, 1972

[54] DUAL TANK AIR BORNE FIRE RETARDANT DISPENSING SYSTEM

[72] Inventor: Dale P. Newton, Chico, Calif.
[73] Assignee: Aero Union Corporation, Chico, Calif.
[22] Filed: July 12, 1971
[21] Appl. No.: 161,528

[52] U.S. Cl. ................................169/1 A, 169/2 A
[51] Int. Cl. .................................................A62c 3/00
[58] Field of Search............169/1 R, 1 A, 2 R, 2 A, 9

[56] References Cited

UNITED STATES PATENTS

| | | | |
|---|---|---|---|
| 1,604,290 | 10/1926 | King | 169/2 A X |
| 2,426,771 | 9/1947 | Harp | 169/2 A X |
| 3,494,423 | 2/1970 | Stansbury et al. | 169/2 R |

*Primary Examiner*—M. Henson Wood, Jr.
*Assistant Examiner*—Edwin D. Grant
*Attorney*—Warren M. Becker et al.

[57] ABSTRACT

A method and apparatus for airborn fire suppression by means of a portable fire retardant chemical dispensing system, readily adaptable, without extensive aircraft modification, to various makes of aircraft, for dispensing current types of forest and range fire fighting chemicals in a conventional and proven manner. A large capacity main slurry storage tank is centrally located within the aircraft and coupled by means of fluid transfer pipes to a lower capacity slurry dispensing tank positioned aft of the main tank in the doorway of the aircraft's cargo doors. Once emptied, the dropping tank is refilled from the main tank. Bleed air from the engines is used to pressurize the system. The system is readily installed and removed from the aircraft with a minimum of tools in a minimum of manhours for increasing utilization of the aircraft.

10 Claims, 2 Drawing Figures

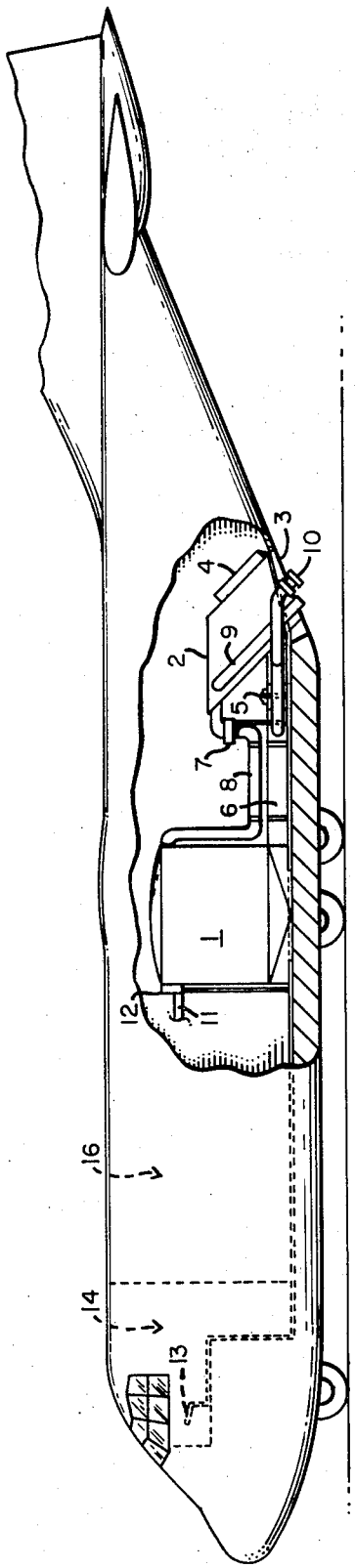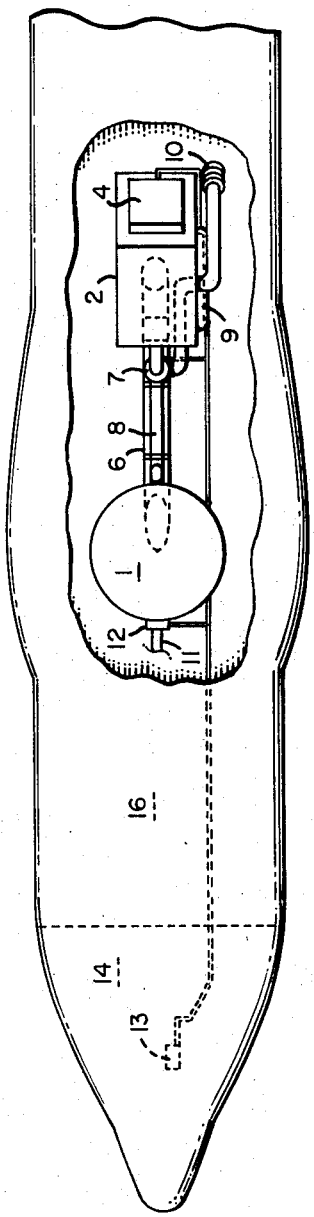
INVENTOR.
DALE P. NEWTON

DUAL TANK AIR BORNE FIRE RETARDANT DISPENSING SYSTEM

BACKGROUND OF THE INVENTION

During large and/or numerous fire outbreaks, the availability of aircraft equipped to drop chemical retardant in fire fighting operations is depleted and the need for additional aircraft, equipped to drop retardant in a conventional manner and capable of operating from existing facilities, becomes apparent. The conventional conversion of an aircraft for this purpose is an extensive modification of a permanent or semi-permanent nature. Conversion of this type for short term operation is prohibitive. This invention is to provide a portable fire retardant dispensing system compatible with current, retardant chemicals, loading facilities, methods of usage and dispensing and available aircraft. A system easily installed, requiring only minor modification to the aircraft, and only while the unit is installed.

DESCRIPTION OF THE DRAWINGS

FIG. 1 is an illustration, partial cut away side view, of an aircraft fire fighting chemical dispensing system in accordance with this invention.

FIG. 2 is a partial top cut away view of FIG. 1.

DESCRIPTION OF A PREFERRED EMBODIMENT

With reference to FIGS. 1, 2 the aircraft shown, a cargo transport, such as a C130, comprises a fuselage 15 having a cargo compartment 16, a flight deck 14 of conventional configuration, and an opening, usable in flight, for a dispensing tank assembly 2. Installed in and attached to the aircraft cargo compartment 16 is a main storage tank 1. Main storage tank 1 is a pressure vessel, designed for an operating pressure of approximately 50 psi. Two ports are located in the upper edge of the tank 1. One connects to a pressurizing valve 12 mounted on the tank, the other connects to a loading transfer pipe 8. One port located in the bottom of the tank, connects to a main transfer pipe 6. Tank 1 is supported by attached frame that is designed to distribute and transmit it's load to the aircraft structure in a normal manner through the cargo floor and attach points. It is installed as a unit and attached to the aircraft using existing provisions for normal cargo restraint. It is used as the primary storage of chemical retardant for the system. In a C130, tank 1 is typically 100 inches in diameter and 85 inches high and has a capacity of 3,000 gallons. The size of tank 1 is, of course, dependent on the capacity and limitations of the particular aircraft in which it is used with due regard given to flight safety. The dispensing tank assembly 2 is typically a bifurcated vessel of conventional design with two openings in its lower surface. These openings are covered by a pair of clam shell doors 3, sealing the tank and making it fluid tight. An actuating mechanism 4 of conventional design is incorporated in and on the tank to open and close the doors when desired. The operating mechanism 4 consists of a torque shaft turning through the tank and supported by the tank structure. Arms are rigidly attached to the shaft at regular intervals with links connecting the arms to the door. Upon rotation of the shaft the door will open or close depending on the direction of rotation. An air driven cylinder not shown mounted on the tank and linked to an arm rigidly attached to the torque shaft provides the operating force. Remote controlled valves mounted on the tank, operate the cylinder for application of desired rotational force. Such a linkage system is provided for each door. Tank assembly 2 is supported by attached frame, and is installed as a unit in such a location as to position the doors 3 of the tank over, or through an existing opening, usable in flight, such as provided by removing an existing cargo door etc. and attached to the aircraft using existing provisions for normal cargo restraint and existing fittings. It's frame is designed to distribute and transmit it's load to the aircraft structure in a normal manner through the cargo floor and attach points. In a C130, tank 2 is typically 50 inches by 50 inches by 88 inches and has a capacity of 1,000 gallons. Similarly, the size of tank 2 is dependent on the weight of material to be carried with due regard given to the limitations of flight safety for the particular aircraft in which it is used. Attached to and incorporated in the dispensing tank is a transfer valve 5. Valve 5 controls the refilling of the dispensing tank 2 from the main tank 1. One side of the valve opens into the dispensing tank 2 and the other side incorporates the attach point for the main transfer pipe 6. The valve is air operated and remotely controlled. Also attached to and incorporated in the dispensing tank 2 is a closing valve 7. One side of the valve opens into the dispensing tank 2, and the other side incorporates the attach point for the loading transfer pipe 8. Incorporated in the dispensing tank assembly 2 is a loading pipe 10. The loading pipe 10 starts at the side of the tank on a plane with the door surface, and is routed to the main transfer pipe 6 on the attach side of the transfer valve 5 where it empties. Also incorporated in the dispensing tank assembly 2 is a vent pipe 9. Vent pipe 9 is routed from a port in the upper corner of the dispensing tank 2, down to a location on a plane with the door surface where it terminates and vents into the atmosphere. The two tanks, z are coupled together by the two transfer pipes 6 and 8. The main transfer pipe 6 connects the lower port in the main tank 1 to the transfer valve 5 in the dispensing tank assembly 2. When connected it provides a fluid tight duct for the rapid transfer of chemical between the two tanks. The loading transfer pipe 8 connects the main tank 1 to the dispensing tank assembly 2, through the closing valve 7. When connected it provides a fluid tight duct for the loading of the dispensing tank 2 (after the main tank 1 is full) during loading operations. The closing valve 7 is normally closed except during loading operations when it is opened to accomplish loading of the dispensing tank 2.

A pipe 11 from the compressor section of the aircraft turbine engine(s) not shown is connected to the pressurizing valve 12 mounted on a main tank 1, providing bleed air at approximately 50 psi for operation of the system. Where the aircraft engine(s) does not include a compressor section, a low pressure pump would be employed to supply the necessary air pressure.

Electric remote operating controls 13 are connected to the tank operating valves and switches and routed to the flight deck 14 where they are located for convenient operation by the controlling flight crew member (generally the pilot). Provisions are made for the control of tank pressurization, door selection and operation, chemical transfer, and monitoring of tank and system status and function using conventional means in a conventional manner. Electric power for control operation is supplied by the aircraft electrical system.

In a typical fire mission using the system described, as the aircraft approaches the fire, the operator sets his remote operating controls 13 to pressurize the main tank 1, selects the type of drop desired (one door, two door etc), arms the dropping system and checks the system status through the monitoring feature of the control unit. The pilot maneuvers the aircraft into the desired position and triggers the selected drop. The selected door(s) will open, releasing the chemical retardant inside the dispensing tank. After the dispensing tank 2 is empty a timed control will automatically close the door(s), activate the transfer valve 5 to open allowing chemical from the pressurized main tank 1 to flow through the main transfer pipe 6 into and refill the dispensing tank 2, closing the valve 5 when the dispensing tank 2 is full. The system is now ready for another drop. This sequence is repeated until the main tank 1 and dispensing tank 2 are empty. The aircraft then returns to a loading station to re-fill with chemical.

While described with respect to the dispensing of fire retardant chemicals, it is understood that the present system may be used for dispensing fluids and particulated solid material for any purpose.

What is claimed is:

1. For use in flight in an aircraft having a conventional flight deck, a conventional cargo space including a cargo floor with conventional provisions in said space and said floor for tying down and restraining the movement of cargo in flight and a fuselage with an opening through which cargo is normally loaded in and unloaded from said aircraft, a portable fluid and solid materials dispensing system comprising: a main storage tank for storing said materials; a dispensing tank adapted to be located adjacent said opening including door means in the lower surface thereof for permitting the dispensing of said materials through said opening; means for loading said main tank; means coupling said main storage tank to said dispensing tank for transferring said materials therebetween; means coupled to said main tank for pressurizing said system; means coupled to said door means for opening and closing said door means; and control means coupled to each of said above named means for selectively controlling the pressurization of said main tank, and the loading and dispensing of said materials from said dispensing tank.

2. A portable material dispensing system according to claim 1 wherein said main tank and said dispensing tank are removably attachable to said aircraft, using principally said normally existing cargo restraining provisions and distribute and transmit their respective loads to the aircraft structure in a normal manner through said cargo floor and said cargo restraining provisions.

3. A portable material dispensing system according to claim 1 wherein said control means is located on said flight deck; said door means comprises an independently operable first door and an independently operable second door; and said control means is electrically coupled to said door means for selectively opening and closing said first and said second door.

4. A portable material dispensing system according to claim 1 wherein said means for transferring said materials between said main tank and said dispensing tank comprises a main transfer pipe and a first remotely controlled valve means for providing in flight transfer of said materials from said main tank to said dispensing tank.

5. A portable material dispensing system according to claim 4 wherein said main tank loading means comprises a first loading pipe coupled to said main transfer pipe for loading said materials into said main tank through said main transfer pipe and wherein said means for transferring said materials between said main tank and said dispensing tank further comprises a second loading pipe and a second valve means for providing for loading of said dispensing tank from said main tank in conjunction with said loading of said main tank.

6. A portable material dispensing system according to claim 5 wherein said main tank is located near the center of gravity of said aircraft and said dispensing tank is located aft of said main tank, and wherein said main tank and said dispensing tank include means for limiting the amount of material carried in said main tank and said dispensing tank for maintaining said aircraft within allowable limits required for flight safety.

7. A portable material dispensing system according to claim 6 wherein said main tank and said dispensing tank have a capacity of 3,000 gallons and 1,000 gallons respectively.

8. A method of dispensing fluid and solid materials from an aircraft in flight comprising the steps of: filling a first main storage tank and a second dispensing tank with said materials; selectively opening one or more doors on said dispensing tank for selectively releasing said materials on a desired area as said aircraft over flies said area; closing said doors; transferring said materials from said main tank to said dispensing tank; and repeating said steps of selectively releasing said materials and filling said dispensing tank until said main tank and said dispensing tank is emptied.

9. A method of dispensing fluid and solid materials from an aircraft in flight according to claim 8 wherein said step of transferring materials from said main tank to said dispensing tank comprises: the steps of pressurizing said main tank and opening a flow control valve in a main transfer line between said main tank and said dispensing tank to permit said materials to flow from said main tank to said dispensing tank.

10. A method of dispensing fluid and solid materials according to claim 9 wherein said step of pressurizing said main tank comprises applying to said main tank relatively low pressure bleed air provided by the engines of said aircraft.

* * * * *